United States Patent

Wu et al.

[11] Patent Number: 6,018,441
[45] Date of Patent: Jan. 25, 2000

[54] DISK DRIVE PIVOT BEARING AND ACTUATOR ARM ASSEMBLY

[75] Inventors: Ruyue Y. Wu; Jamshid Bozorgi, both of Fremont, Calif.

[73] Assignee: Read-Rite Corporation, Milpitas, Calif.

[21] Appl. No.: 09/093,042

[22] Filed: Jun. 8, 1998

[51] Int. Cl.[7] ..................................................... G11B 5/55
[52] U.S. Cl. ............................................................. 360/106
[58] Field of Search ............................. 360/106; 384/295, 384/296

[56] References Cited

U.S. PATENT DOCUMENTS

| | | | |
|---|---|---|---|
| 5,089,736 | 2/1992 | Oyafuso | 310/90 |
| 5,109,310 | 4/1992 | Ohkjita et al. | 360/106 |
| 5,279,018 | 1/1994 | Glenn, III | 15/412 |
| 5,473,489 | 12/1995 | Sanada | 360/106 |
| 5,557,490 | 9/1996 | Jabbari | 360/106 |
| 5,666,243 | 9/1997 | Brent | 360/106 |
| 5,751,519 | 5/1998 | Hata | 360/106 |
| 5,829,339 | 11/1998 | Smith | 92/63 |
| 5,844,754 | 12/1998 | Stefansky et al. | 360/106 |

*Primary Examiner*—Jefferson Evans
*Attorney, Agent, or Firm*—Nathan N. Kallman

[57] ABSTRACT

A disk drive includes a pivot bearing and actuator arm. The actuator arm includes a stepped pivot bearing housing. The pivot bearing housing has a first nominal inside diameter and a relatively smaller second nominal inside diameter to align the pivot bearing within the bearing housing. The pivot bearing has a body and a head. The head press-fits within the first inside diameter and the body press-fits within the second inside diameter to align the bearing assembly in the bearing housing. The body diameter of the bearing assembly is smaller than the bearing housing first nominal diameter to enable the bearing housing to pre-align the bearing assembly with respect to the bearing housing.

20 Claims, 4 Drawing Sheets

DISK DRIVE PIVOT BEARING AND ACTUATOR ARM ASSEMBLY

FIELD OF THE INVENTION

The present invention relates to disk drives and in particular to voice coil motor (VCM) pivot bearings used in disk drives.

BACKGROUND ART

Disk drives are widely used for data storage. A typical disk drive includes one or more rotatable disks and an actuator arm. A suspension attached to the actuator arm supports a magnetic head which reads and writes data to selected tracks on the disk surface.

A pivot bearing supports the actuator arm, enabling the arm to pivot the magnetic head between tracks. Precise positioning of the magnetic head at a particular track must be accomplished if the stored data on that track is to be read. Accordingly, it is critical that the pivot bearing minimize play in the actuator arm.

Pivot bearings are typically press-fit into an actuator arm bearing housing to minimize actuator arm play. For example, U.S. Pat. No. 5,041,934 to Stefansky describes a typical actuator assembly with a press-fit pivot bearing. The bearing 162 is cylindrical, having a recessed middle portion, a first end and a second end. The ends have equal diameters, which press-fit into the actuator arm bearing housing. A drawback of the bearing design employed by Stefansky is that in order to press-fit both ends of the bearing into the actuator arm, the first bearing end presses fully through the full length of the bore. Pressing the first end deforms (i.e. widens) the bore. When the second bearing end enters the pre-widened bore, the resulting press-fit is looser at the second bearing end than the press-fit of the first bearing end. Bearing misalignment may adversely affect vibration characteristics of the actuator arm and the disk drive. In extreme cases, actuator arm vibration may shift the read/write head from a particular track. This can delay or inhibit reading of data from the track.

U.S. Pat. No. 5,539,597 to Blanks describes a pivot assembly for an actuator arm having two sets of cylindrical-shaped bearings. The Blanks bearing housing provides two discrete shoulders 38 and 40 to enable each bearing to seat during a press-fit. Independently seating bearings reduces the pre-widened bore problem identified with respect to Stefansky. Increasing the number of bearings required by the actuator arm, however, increases the probability of misalignment of any one bearing. Installation of multiple bearings is typically more complicated than single bearing installation. A better way of assuring actuator arm alignment is desired.

SUMMARY OF THE INVENTION

The present invention includes a disk drive having an enclosure, a voice coil motor, a disk motor, rotatable disks and an actuator arm. The actuator arm supports a suspension and a magnetic read/write head. A voice coil motor pivots the actuator arm, driving the head suspension assembly across particular disk tracks to read and write data. In accordance with this invention, the actuator arm includes a stepped pivot bearing housing and a bearing assembly. The bearing assembly mounts in the stepped bearing housing, aligns the actuator arm with the disks and enables the actuator arm to pivot.

The bearing assembly includes a shaft, an inner race and an outer race. The races co-axially surround the shaft. The bearing body and bearing head define the outer race. Preferably, the bearing assembly has two ends and a recessed middle. The bearing head is defined at one end, the body is defined at the other end. Both the bearing head and the body define cylindrical sections. The cylindrical sections press-fit within the bearing housing with generally equal radial pressures. According to one aspect of the invention, the cylindrical sections have a beveled edge.

The pivot bearing housing has a first nominal inside diameter and a relatively smaller second nominal inside diameter to optimize the fit between the bearing and bearing housing assembly. The bearing head press-fits with the first inside diameter and the body press-fits within the second inside diameter to align the bearing into the housing and achieve uniform contact force on both bearing head and bearing body.

The body diameter of the bearing is smaller than the bearing housing first nominal diameter to enable the bearing to pre-align with respect to the bearing housing. Pre-alignment eases insertion of the bearing into bearing housing during installation and reduces non-uniform deformation of the bearing housing due to installation of a mis-aligned bearing assembly.

It can be appreciated that single or multi-race bearings can be employed in accordance with the present invention. It can also be appreciated that the bearing assembly is stepped and bearing assemblages configured with multiple additional steps can be used in properly configured actuator arm bearing housings in accordance with the present invention.

The body of the bearing assembly press-fits within the bearing housing with an associated radial pressure. The bearing head press-fits within the bearing housing with an associated radial pressure, which is generally equal to the radial pressure associated with the body. The equal radial pressure will ensure alignment between the bearing and bearing housing.

The present invention improves existing bearing assembly designs to simplify assembly of the bearing and actuator arm, reduces damage to bearing housing edges and surfaces during such assembly and improves alignment of the magnetic read/write head with the track to be read. Such improvements will result in increased dynamic performance for the disk drive.

DETAILED DESCRIPTION OF THE INVENTION

Figure 1:
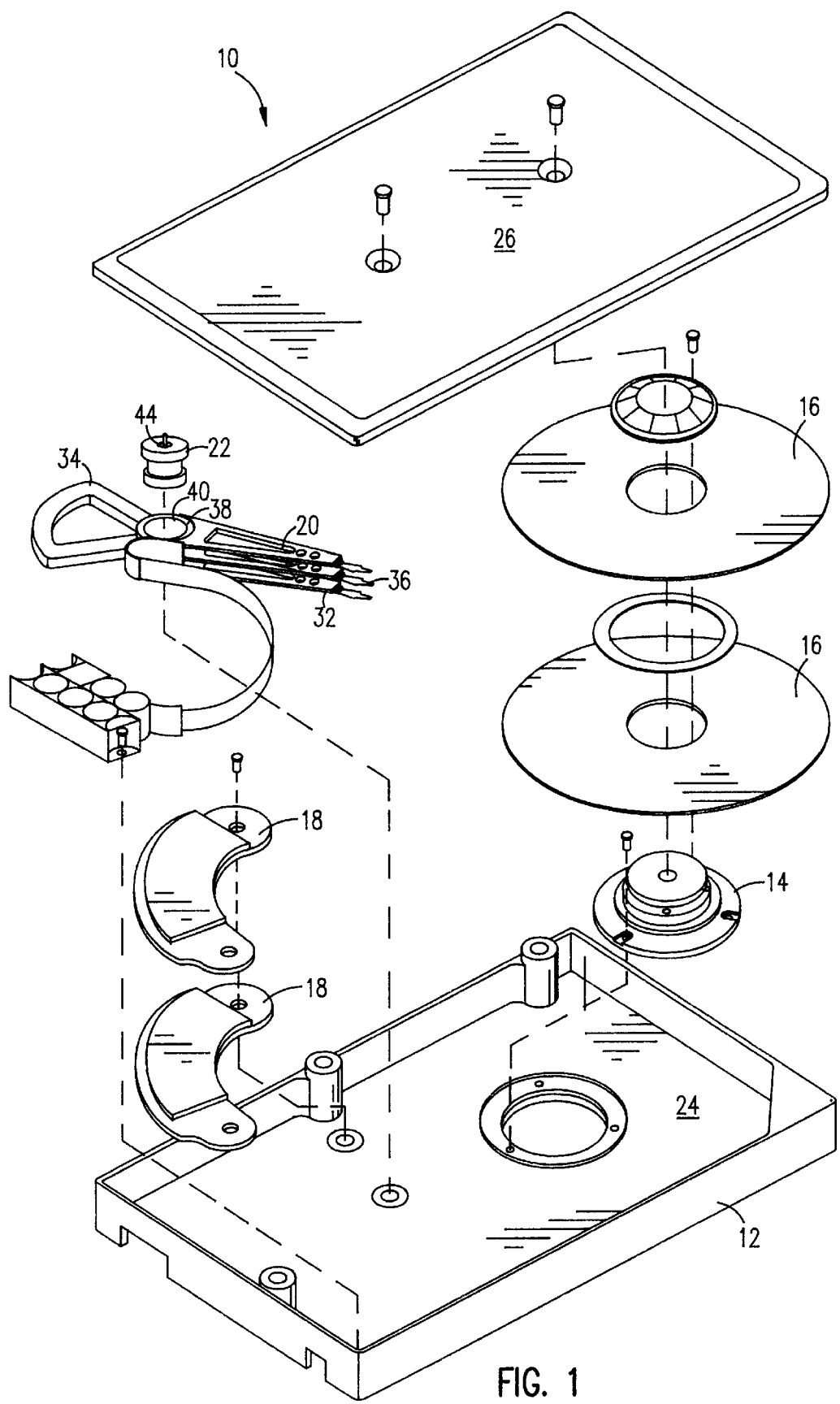
FIG. 1 is an exploded perspective view of a disk drive in accordance with the present invention.

In FIG. 1, a disk drive 10 includes an enclosure 12, a disk motor 14, disks 16, an actuator magnet assembly 18, an actuator arm 20 and a pivot bearing assembly 22. The enclosure 12 has a base 24 and a cover 26. The actuator magnet assembly 18 mounts on the base 24. The pivot bearing assembly 22 mounts the actuator arm 20 on the base 24. The disks 16 mount on the disk motor and rotate. The cover 26 attaches to the base 24 to seal the enclosure 12.

The actuator arm 20 has two ends 32 and 34, and a head suspension assembly 36 mounted at the one end 32. The actuator arm 20 defines a bearing housing 38 with a bore 40. The disk motor 14 mounts the disks 16 on the base 24 in operative alignment with actuator arm 20. In operation, the disk motor 14 rotates the disks 16 and the actuator arm 20 pivots the head suspension assembly 36 to read data from the disks 16.

Figure 2:
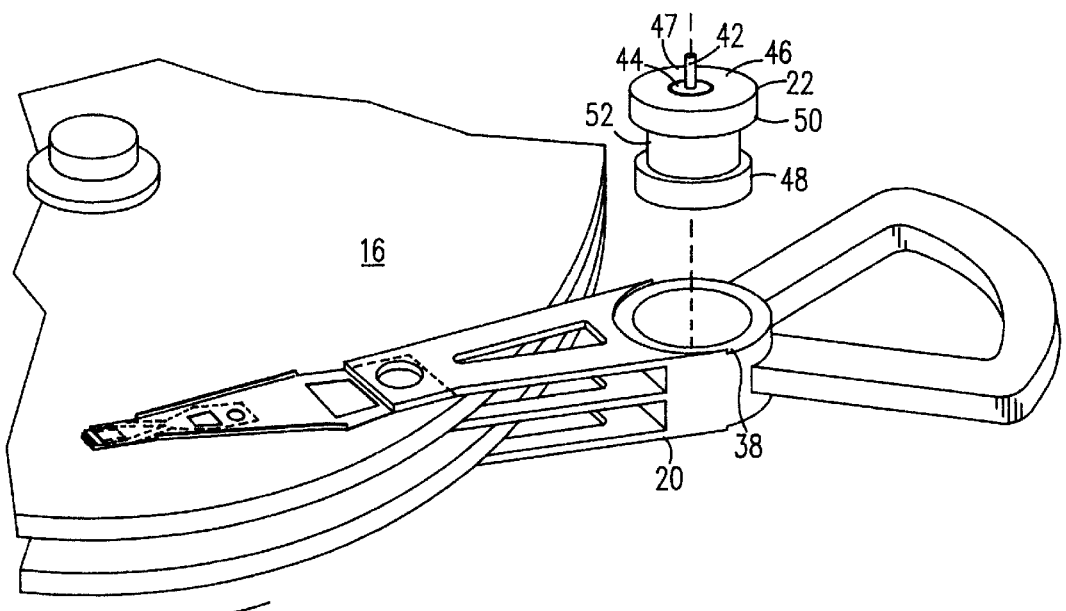
FIG. 2 is a perspective view of the bearing assembly of FIG. 1 exploded from the actuator arm.

FIG. 2 shows the actuator arm 20 and the bearing assembly 22. The bearing assembly 22 includes a shaft 42, an inner race 44 and an outer race 46. The inner race 44 and outer race 46 co-axially surround the shaft 42. The outer race 46 has a top end 47 and an opposite bottom end (not shown). The outer race 46 defines a body 48 at the opposite bottom end, a bearing head 50 at the end 47, and a recessed middle 52. The bearing head 50 and the body 48 are each formed with a cylindrical section having contact surfaces, which contact the bearing housing 38 when the bearing assembly 22 press-fits into the actuator arm 20 bearing housing 38. The recessed middle 52 separates the bearing head 50 and body 48.

Figure 3:
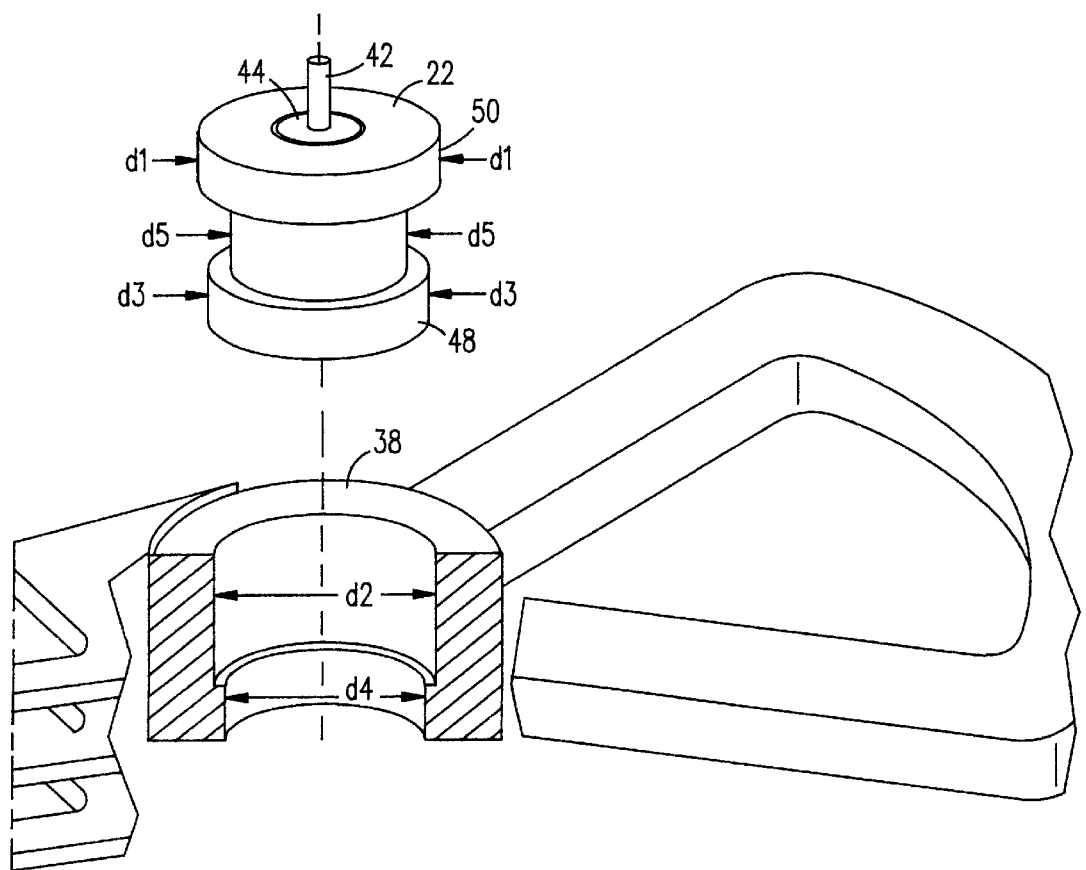
FIG. 3 is a cutaway perspective view of the bearing assembly and bearing housing of FIG. 2.

FIG. 3 shows the bearing housing 38 and the bearing assembly 22. The bearing assembly 22 has a head diameter $d_1$ and a body diameter $d_3$. The head diameter $d_1$ is greater than the body diameter $d_3$. The recessed middle 52 has a diameter $d_5$, which is smaller than both the body diameter $d_3$ and the head diameter $d_1$.

The bearing housing 38 is stepped having a first nominal inside diameter $d_2$ and a second, relatively smaller, nominal inside diameter $d_4$. The nominal diameters of the bearing housing 38 and the diameters of the bearing assembly 22 are nominally sized so that $d_1 > d_2 > d_3 > d_4 > d_5$. It can be appreciated that after the bearing assembly 22 press-fits into the bearing housing 38, the housing 38 deforms. The bearing head 50 and body 48 of the bearing assembly 22 widen the diameters $d_2$ and $d_4$ of the bearing housing 38, respectively, during press-fit.

Figure 4:
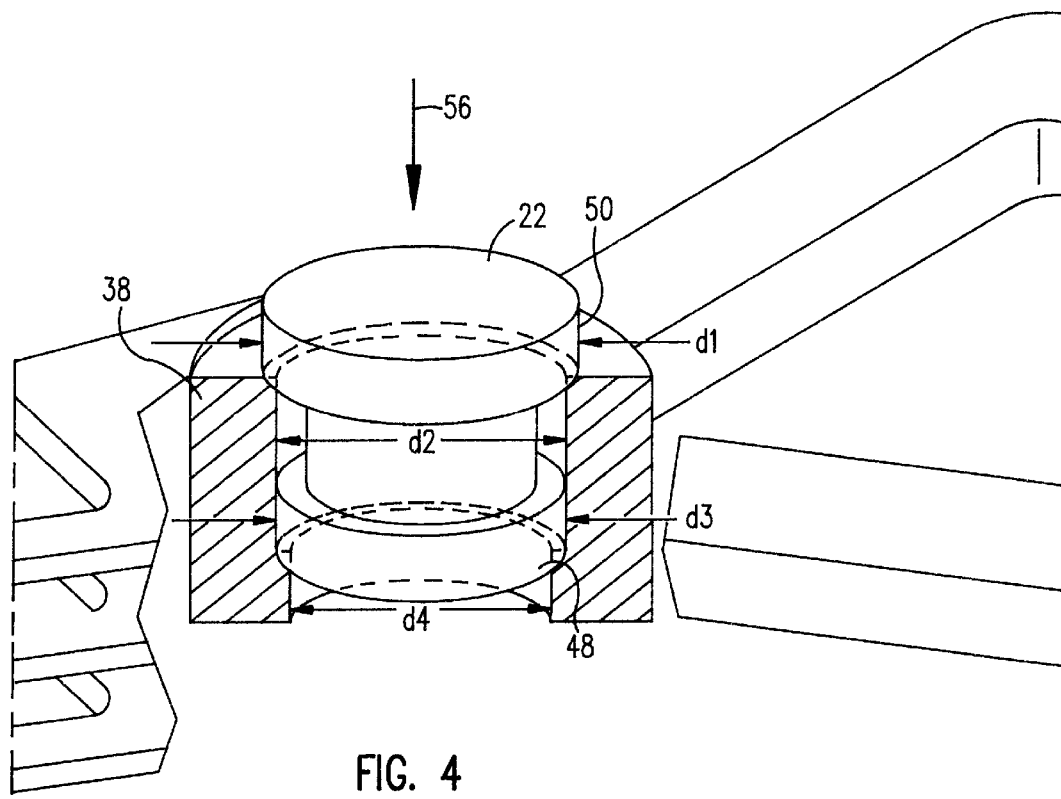
FIG. 4 is a cutaway perspective view of the bearing assembly seating in the bearing housing.

FIG. 4 shows the bearing assembly 22 sliding into the bearing housing 38. The body 48 of the bearing assembly 22 has a diameter $d_3$ and slides freely along the portion of the bearing housing 38, which has a relatively larger diameter $d_2$. The bearing housing 38 pre-aligns the bearing assembly 22 within the bearing housing 38 and guides the bearing assembly 22 into the bearing housing 38 until the body 48 seats adjacent the portion of the bearing housing 38 having a diameter $d_4$. When the body 48 seats, the bearing head 50 simultaneously seats adjacent the portion of the bearing housing 38 having a diameter $d_2$. Pre-alignment of the bearing assembly 22 and the bearing housing 38 inhibits non-uniform deformation of the bearing housing, eases assembly of the bearing assembly and bearing housing, and optimizes the press-fit between the bearing assembly and the bearing housing to minimize actuator arm vibration and play.

When the bearing assembly 22 pre-aligns within the bearing housing 38, and the body 48 seats adjacent $d_4$, the bearing assembly 22 press-fits into the bearing housing 38. Downward pressure in the direction of the arrow 56 presses the bearing assembly 22 into the bearing housing 38. The bearing head 50 and body 48 simultaneously deform the bearing housing 38. In particular, the body 48 uniformly increases the diameter $d_4$ as the bearing head 50 uniformly increases a portion of the diameter $d_2$. The bearing head 50 and body 48 are each sized relative to the corresponding diameters of the bearing housing 38 to apply generally equal radial pressure against the bearing housing 38 during and after the press-fit.

Generally equal radial pressure assures that a uniform degree of housing deformation will result as between the diameter $d_4$ and the diameter $d_2$. Equal radial pressure maintains alignment between the bearing assembly 22 and the bearing housing 38. The bearing head 50 and the body 48 maintain coaxial alignment with the bearing housing 38.

Figure 5:
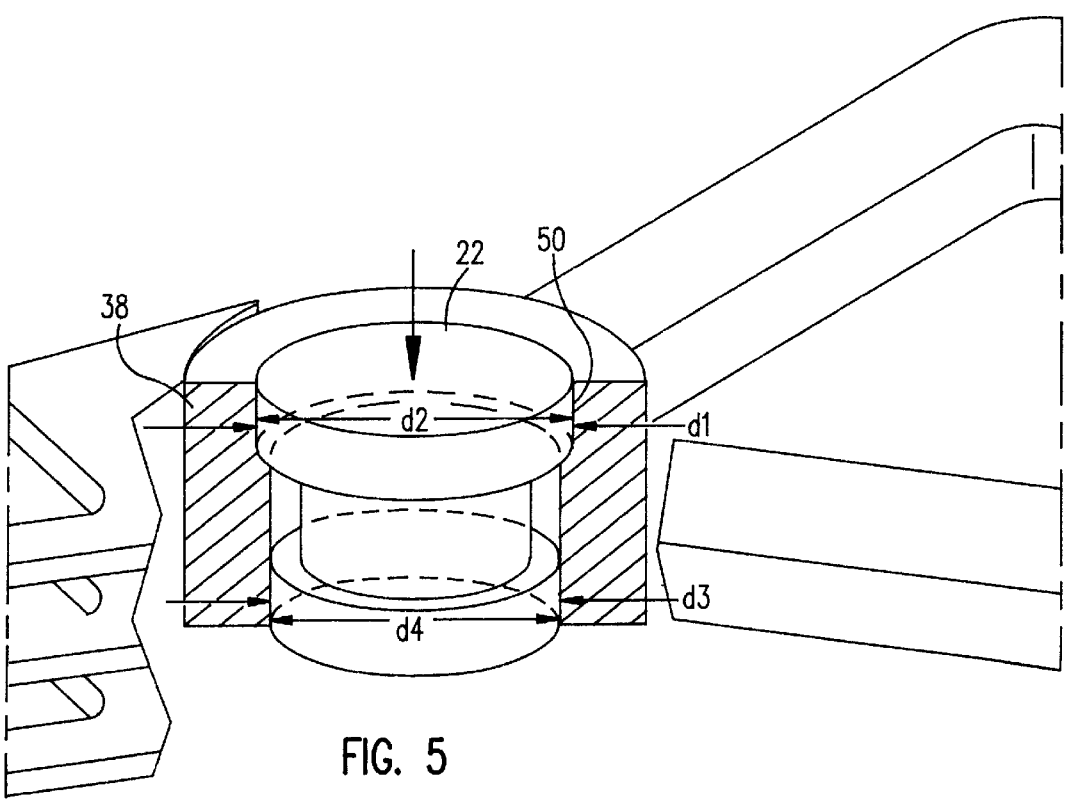
FIG. 5 is a cutaway perspective view of the bearing assembly press-fit in the bearing housing.

FIG. 5 shows the bearing assembly 22 press-fit into the bearing housing 38. The bearing assembly 22 does not significantly deform. A portion of the bearing housing 38 deforms, i.e. nominal diameter $d_2$ increases to press-fit with the diameter $d_1$ of the bearing assembly bearing head 50. The nominal inside diameter $d_4$ of the bearing housing 38 increases to press-fit with the diameter $d_1$ of the bearing head 50.

Figure 6:
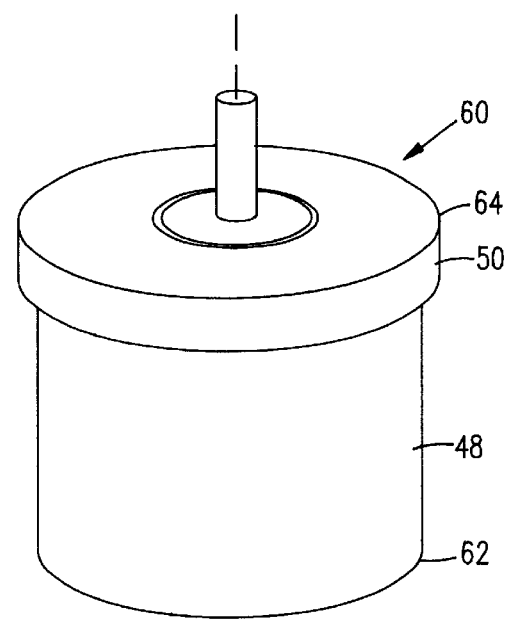
FIGS. 6–8 are perspective views of alternate bearing assembly shapes.

FIG. 6 shows a bearing assembly 60 having a body 48 and a bearing head 50. The bearing body 48 has an end 62 and a uniformly cylindrical shape extending between the end 62 and the bearing head 50. The head 50 has a uniformly cylindrical shape and overhangs the body 48. The uniformly cylindrical shape of the body 48 and head 50 simplifies manufacturing and assembly.

Figure 7:
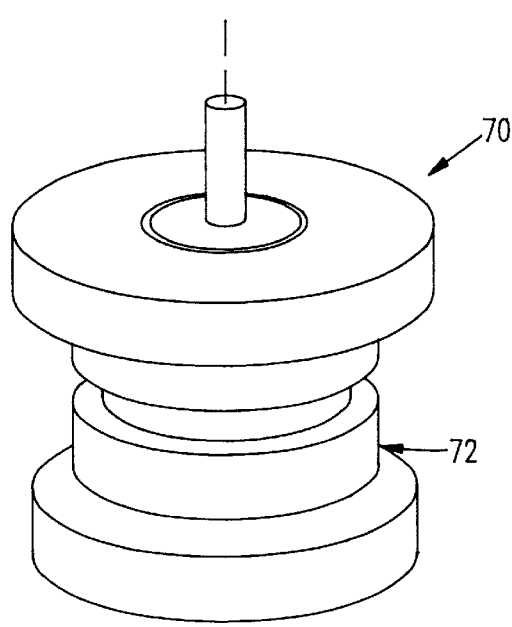

FIG. 7 shows a bearing assembly 70. The bearing assembly 70 includes a recessed middle 72. The recessed middle 72 is stepped, having varying diameters to minimize mass of the bearing assembly 70. Minimizing mass of the bearing assembly 70 reduces inertia, which must be overcome to pivot the bearing assembly, and ultimately the actuator arm.

Figure 8:
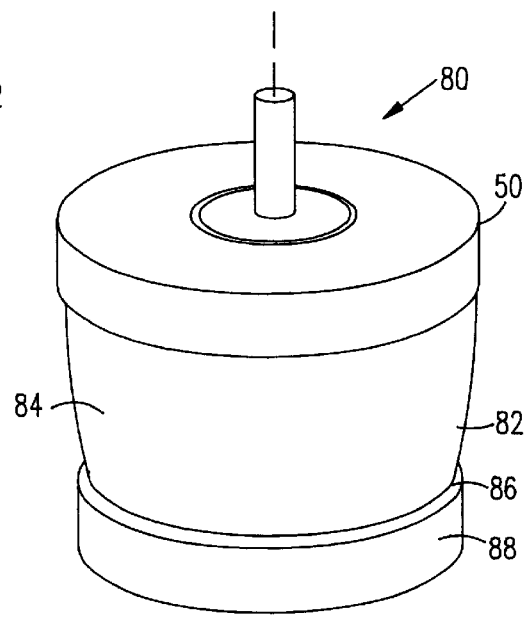

FIG. 8 shows a bearing assembly 80 having a body 48 and a bearing head 50. The bearing assembly 80 includes a middle portion 82. The middle portion 82 has curved sides 84 and a truncated parabolic shape. The end 48 has beveled edge 86 adjacent to the middle portion 82. It can be appreciated, however, that the beveled edge 86 can also be formed on the other side of the end 88, opposing the middle portion 82 of the bearing assembly 80. Beveling the edge 86, or other edges, may reduce damage to the bearing housing during assembly and disassembly.

It should be understood that the invention is not necessarily limited to the specific embodiments set forth above, and that alternative approaches and various modifications may be implemented within the scope of this invention. For example, the housing bore may be modified using surface texture variations and lubricants to effect the press-fit.

What is claimed is:

1. A disk drive comprising;

an enclosure;

a disk motor mounted in the enclosure;

a rotatable disk mounted on the disk motor;

an actuator arm mounted in the enclosure and having a magnetic head suspension and a pivot bearing housing, said pivot bearing housing being stepped, having a first nominal inside diameter and a relatively smaller second nominal inside diameter; and a bearing assembly having a body and a head, wherein the head press-fits within the first inside diameter and the body press-fits within the second inside diameter to align the bearing assembly in the bearing housing.

2. A disk drive as set forth in claim 1, wherein the body has a diameter and the head has a diameter, the body diameter being relatively smaller than the head diameter.

3. A disk drive as set forth in claim 2, wherein the bearing assembly has two ends, the head defines a cylindrical section at one end, and the body defines a cylindrical section at the other end.

4. A disk drive as set forth in claim 3, wherein the first end of the bearing assembly press-fits within the bearing housing with a first radial pressure and the second end press-fits within the bearing housing with a second radial pressure which is substantially equal to said first radial pressure to ensure alignment between the bearing assembly and the bearing housing.

5. A disk drive as set forth in claim 1, wherein the body diameter of the bearing assembly is smaller than the first inside diameter of the bearing housing to enable the bearing housing to pre-align the bearing assembly.

6. A disk drive as set forth in claim 1, wherein the bearing assembly has a recessed middle defined between the bearing assembly head and body.

7. A disk drive as set forth in claim 1, wherein the bearing assembly includes a shaft, an inner race and an outer race, the races co-axially surrounding the shaft.

8. An assembly for use with a disk drive comprising:

an actuator arm for transporting a head suspension assembly relative to the surface of a disk;

a stepped pivot bearing housing;

a bearing assembly for mounting within said bearing housing to enable said actuator arm to pivot relative to said surface of the disk, said bearing assembly formed with a body having a cylindrical section with a first outside constant diameter, and a head having a cylindrical section with a second outside constant diameter, the second outside diameter being relatively greater than the first outside diameter, and a recessed middle defined between the body and the head;

said cylindrical sections being press-fit within said bearing housing with equal radial pressures, so that said bearing assembly is aligned with said bearing housing, whereby uniform contact force is applied to both said head and said body of said bearing assembly.

9. A bearing assembly as set forth in claim 8, wherein the bearing assembly has a shaft, an inner race and an outer race in coaxial alignment.

10. A disk drive as set forth in claim 8, wherein the bearing assembly includes a shaft, an inner race and an outer race, wherein the outer race defines the body and head.

11. An assembly as in claim 8 comprising;

said recessed middle being stepped and having varying diameters.

12. An assembly as in claim 8, comprising:

wherein the cylindrical section of the body has a beveled edge.

13. A bearing assembly as set fourth in claim 12, wherein the beveled edge is adjacent to the recessed middle.

14. A method of inserting a pivot bearing into a bearing housing of an actuator arm comprising the steps of:

providing a bearing assembly with a body and a head and a stepped bearing housing having a first nominal diameter and a relatively smaller second nominal diameter;

guiding the body of the bearing towards the second diameter;

press-fitting the body of the bearing assembly into the second diameter; and press-fitting the bearing assembly head of the bearing assembly into the first diameter.

15. A method as set forth in claim 14, wherein the first nominal inside diameter guides the body towards the second nominal diameter.

16. A method as set forth in claim 14, wherein the step of guiding simultaneously seats the body adjacent to the second nominal diameter and the bearing assembly head adjacent to the first nominal diameter.

17. A method as set forth in claim 15, wherein the step of guiding pre-aligns the body of the bearing assembly with the second diameter and pre-aligns the bearing assembly head with the first diameter.

18. A method as set forth in claim 14, wherein the steps of press-fitting the body and the head of the bearing assembly are accomplished simultaneously.

19. A method as set forth in claim 17, wherein the steps of press-fitting the body and the head expand the second and first nominal diameters of the housing, respectively.

20. A method as set forth in claim 17, wherein the steps of press-fitting the body and the head press the body and the head into the bearing housing with substantially equal radial pressures.

* * * * *